(12) United States Patent
Vilner et al.

(10) Patent No.: US 9,234,101 B2
(45) Date of Patent: Jan. 12, 2016

(54) COLORANTS FOR METALORGANIC COMPOUNDS AND THEIR APPLICATION IN ELECTRONIC DISPLAY TECHNOLOGY

(75) Inventors: Stanislav G. Vilner, South Lebanon, OH (US); Lisa Clapp, Cincinnati, OH (US); Russell Schwartz, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 243 days.

(21) Appl. No.: 13/992,075

(22) PCT Filed: Dec. 16, 2011

(86) PCT No.: PCT/US2011/065466
§ 371 (c)(1),
(2), (4) Date: Aug. 12, 2013

(87) PCT Pub. No.: WO2012/102802
PCT Pub. Date: Aug. 2, 2012

(65) Prior Publication Data
US 2013/0313491 A1 Nov. 28, 2013

Related U.S. Application Data

(60) Provisional application No. 61/423,737, filed on Dec. 16, 2010.

(51) Int. Cl.
*C09B 67/44* (2006.01)
*G02B 3/14* (2006.01)
*G02B 26/00* (2006.01)

(52) U.S. Cl.
CPC ............... *C09B 67/0083* (2013.01); *G02B 3/14* (2013.01); *G02B 26/005* (2013.01)

(58) Field of Classification Search
CPC .......... G02B 23/02; G02B 3/04; G02B 27/02; G02B 33/14; G02B 26/005; G02B 26/00; G09G 5/00; C09B 67/003; C09B 67/0083; C09B 67/44
USPC ................ 252/519.21, 519.2, 521.3; 359/290
See application file for complete search history.

(56) References Cited

U.S. PATENT DOCUMENTS

| | | | |
|---|---|---|---|
| 8,520,286 B2 * | 8/2013 | Clapp et al. | 359/270 |
| 2010/0126378 A1 * | 5/2010 | Vilner | 106/31.75 |
| 2012/0092753 A1 * | 4/2012 | Heikenfeld et al. | 359/296 |
| 2012/0154896 A1 * | 6/2012 | Clapp et al. | 359/290 |
| 2015/0118494 A1 * | 4/2015 | Vilner et al. | 428/402 |

FOREIGN PATENT DOCUMENTS

| | | |
|---|---|---|
| JP | 2003-96191 | 11/2004 |
| WO | WO 2008134190 A2 * | 11/2008 |
| WO | WO 2009/036272 | 3/2009 |
| WO | WO 2010/104606 | 9/2010 |
| WO | WO 2012102802 A1 * | 8/2012 |

OTHER PUBLICATIONS

International Search Report dated Apr. 23, 2012 for Application No. PCT/US2011/065466.
Raj, et al., "Ion and Liquid Dependant Dielectric Failure in Electrowetting Systems", Langmuir, 25 (20): 12387-12392, Aug. 3, 2009.
Written Opinion dated Apr. 23, 2012 for Application No. PCT/US2011/065466.

* cited by examiner

*Primary Examiner* — Douglas McGinty
(74) *Attorney, Agent, or Firm* — Frost Brown Todd LLC

(57) ABSTRACT

Colored metalorganic fluids for electrowetting, electrofluidic, and electrophoretic devices are disclosed. The colored fluid can include a polar or nonpolar solvent including silicon and/or germanium and a modified, oligomeric, or polymeric dye. The dye includes a chromophore attached to a low molecular weight group with molecular weight 10 to 800 or an oligomeric or polymeric chain, which includes silicon and/or germanium. The dye has a molecular weight from 100 to 100,000, solubility in the solvent of at least 5% wt at 25° C., and a dynamic viscosity from 0.5 cPs to 2,000 cPs at 25° C. If the solvent is polar, the fluid has a conductivity from about 0.01 pS/cm to 3000 pS/cm, a surface tension of 15 dynes/cm to 90 dynes/cm at 25° C., and a total content of monatomic ions with radii smaller than 2.0 A and polyatomic ions with radii smaller than 1.45 A less than 500 ppm.

20 Claims, 3 Drawing Sheets

COLORANTS FOR METALORGANIC COMPOUNDS AND THEIR APPLICATION IN ELECTRONIC DISPLAY TECHNOLOGY

CROSS REFERENCE TO RELATED APPLICATIONS

The present application hereby claims the benefit of PCT/US2011/065466, filed on Dec. 16, 2011, which claimed benefit of the provisional patent application of the same title, Ser. No. 61/423,737, filed on Dec. 16, 2010, the disclosure of which is hereby incorporated by reference in its entirety.

TECHNICAL FIELD

The present invention relates generally to the field of electrowetting, and more specifically to colored fluids for electrowetting, electrofluidic, or electrophoretic devices and to electrowetting, electrofluidic, and electrophoretic devices using the same.

BACKGROUND

Interfacial tension between two immiscible fluids can be controlled by electrical potential. This basic principle is used in a diverse and continuously growing group of electro-optical modulated displays that include devices in which the optical state of an imaging material is modulated or changed by subjecting the imaging material to an electric field or the transport of electrons, for example, electrowetting, electrophoretic or electrochromic devices.

Electrowetting has become an attractive modulation scheme for a variety of optical applications due in part to a desirable combination of high brightness and contrast ratio, a large viewing angle, and a fast switching speed. In addition, the power consumption of electrowetting displays is relatively low because they do not require front or backlighting. For example, electrowetting has been used to provide optical switches for fiber optics, optical shutters or filters for cameras and guidance systems, optical pickup devices, optical waveguide materials, and video display pixels. The term "electrowetting" describes the effects of an electric field on the contact angle of a liquid with a hydrophobic surface. With an electric field, the liquid distributes over, or wets, a surface that initially repels the liquid resulting in a change in the spectral properties of a device. When the electric field is removed, the contact angle increases and the liquid contracts into an area whereby the spectral properties are returned to the initial state.

Early electrowetting systems employed water and mixtures of water and other polar solvents. However, the physical properties of water, such as expansion at higher temperature and freezing point, limit the applications for such devices. To overcome problems associated with the use of water, other solvents, such as glycols, propylene carbonate, diethylcarbonate, diacetone alcohol, cyclohexanone, butylacetate, propylacetate, gamma-butyrolactone, ethylhexanol, and ionic fluids, have been proposed to replace water. Non-polar solvents that can be utilized include linear or branched alkane, for example, decane, dodecane and tetradecane, arylalkane, a fatty acid and alcohol, aromatic or alicyclic hydrocarbon, a heterocyclic compound, a halogenated hydrocarbon, and metalorganic compounds based on silicon or germanium, including silicone oils, cyclic siloxanes, or combinations thereof. Silicone and organosilicone fluids, for example, have recently become a solvent of choice for many electrowetting devices due to a useful combination of properties such as low viscosity and surface tension, a wide range of working temperatures, good stability, low toxicity and flammability. Despite this, the use of silicone fluids is greatly limited due to very poor compatibility with colorants. Commercially available dyes, in particular, demonstrate very low, if any, solubility in these fluids. Stabilization of pigment dispersions based on silicone fluids presents a serious challenge.

Colored imaging fluids are an indispensible part of electrofluidic and electrowetting devices, where reproduction of visual information and effects are required for the application. Conventional electrowetting devices typically have a colored oil that forms a film, for example, over an insulating fluoropolymer. This colored oil film imparts a visible color to the device. When a voltage is applied between a water layer situated above the oil film and an electrode beneath the insulating fluoropolymer, the oil film is disrupted as water electrowets the surface. The disrupted oil film no longer provides color to the device. Once the voltage is removed, the oil preferentially wets the insulating fluoropolymer, the oil film is reformed, and the color is again evident. Devices that utilize colored polar fluids in combination with non-colored oil have emerged recently.

In general, the colorant for the colored fluids can be a dye or a pigment. Historically, dyes have been the colorant of choice for various digital applications such as inkjet inks, color filters and electrowetting devices. This fact is not difficult to understand given the great variety of products demonstrating a range of vivid and intense colors, low viscosity of solution, excellent transparency and stability of colored fluids. The dye is generally soluble in application media. That is, it is dispersed in the solvent to the molecular level or relatively small clusters (associates), for example dimers, trimers, tetramers and so on. Application of oligomeric and polymeric dyes is also well known for coloration of various materials, for example, inks, including inkjet inks, coatings, plastics, photoresists, toners, food, cosmetics and personal care, textiles, pharmaceuticals, medical devices, for example, contact lenses, waxes, and fuels among the others. Dyes however have certain disadvantages including poor light and weather fastness. Commercially available conventional dyes and polymeric dyes, generally have very poor solubility in organosilicon materials, or are insoluble altogether. Other disadvantages of conventional dyes include high cost, especially for purified forms, inadequate solubility in non-polar solvents, low resistance to bleed, and/or a lack of opacity. In applications where dyes have been employed as coloring agents, organic pigments have been finding increased utility in recent years due to desirable light fastness and resistance to solvents and bleed. Pigments, on the other hand, are less transparent and stabilization of the pigment dispersion is always a serious concern.

While the problems associated with the use of solvents and colorants are being addressed, there still remains a clear need for improved colored fluids for a variety of electrowetting, electrofluidic, and electrophoretic devices.

It would thus be beneficial to provide an improved colored fluid, particularly an improved colored metalorganic fluid, which overcomes the solubility issues and other problems associated with using colorants for coloration of fluids including metalorganic solvents. Such improved colored metalorganic fluids are suitable for use with electrowetting, electrofluidic, or electrophoretic devices that can demonstrate desirable color and stability properties, have minimal or no negative impact on device components, enhance device performance, and maintain a desired function over a preferred period of time.

SUMMARY

The embodiments of the invention provide colored metalorganic fluids for an electrowetting, electrofluidic, or an electrophoretic device. In one example, modified, oligomeric, and/or polymeric dyes, optionally in combination with one or more pigments, are provided for coloration of metalorganic fluids, such as silicon or germanium fluids, for electrowetting, electrofluidic, or electrophoretic technology.

In one embodiment, the colored metalorganic fluid includes at least one polar or non-polar solvent including silicon and/or germanium and at least one modified, oligomeric, or polymeric dye in the solvent. The dye has at least one chromophore attached to a low molecular weight group with molecular weight 10 to 800 or an oligomeric or polymeric chain, which includes silicon and/or germanium. The dye has a total molecular weight from 100 to 100,000, solubility in the solvent of at least 5% by wt at 25° C., and a dynamic viscosity from 0.1 cPs to 2,000 cPs at 25° C. If the solvent is the polar solvent, the colored metalorganic fluid has a conductivity from about 0.01 µS/cm to 3000 µS/cm, a surface tension of 15 dynes/cm to 90 dynes/cm at 25° C., and a total content of monatomic ions with radii smaller than 2.0 Å and polyatomic ions with radii smaller than 1.45 Å less than 500 ppm. And, if the solvent is the non-polar solvent, the colored metalorganic fluid has conductivity less than $5 \times 10^{-3}$ µS/cm and a surface tension of 10 dynes/cm to 40 dynes/cm at 25° C. The colored metalorganic fluid can optionally include a pigment. The colored metalorganic fluid defines a colored metalorganic polar and/or colored metalorganic non-polar fluid. In one example, the polar solvent is a hydrophilic compound including silicon and/or germanium. In another example, the non-polar solvent is a hydrophobic compound including silicon and/or germanium.

In another embodiment, an electrowetting or electrofluidic device includes the colored metalorganic polar and/or colored metalorganic non-polar fluid. In another embodiment, an electrophoretic device includes the colored metalorganic non-polar fluid. In still another embodiment, a pixel for a display includes the colored metalorganic polar and/or a colored metalorganic non-polar fluid.

In yet another embodiment, a method for changing a display state of a pixel for a display is provided. The method includes applying a potential difference to a reservoir of the pixel, which includes the colored metalorganic polar and/or a colored metalorganic non-polar fluid, via a plurality of electrodes to create a change in the display state of the pixel by moving or changing the shape of the colored metalorganic fluid.

The use of such colored metalorganic fluids in display technologies offers improvements in durability, and provides higher levels of chroma and an ability to achieve higher contrast ratios through dyes and pigment selection. The colored metalorganic fluids can also provide fast switching speeds, low power consumption, and greater device durability.

BRIEF DESCRIPTION OF THE DRAWINGS

The accompanying drawings, which are incorporated in and constitute a part of this specification, illustrate embodiments of the invention, and together with a general description of the invention given above, and the detailed description of the embodiments given below, serve to explain the principles of the invention.

DETAILED DESCRIPTION OF SPECIFIC EMBODIMENTS

Figure 1A:
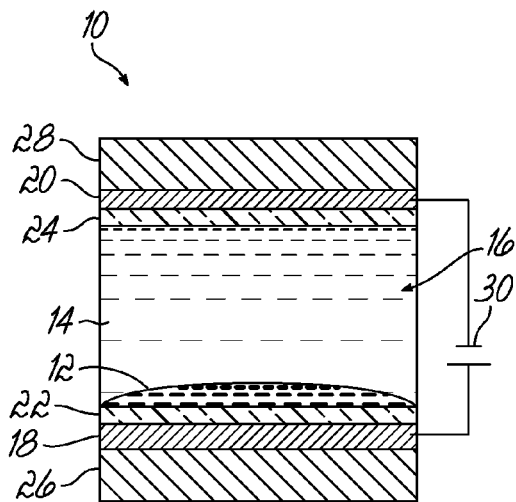
FIG. 1A is a diagrammatic cross-sectional view of an electrowetting device operating as a display pixel in accordance with an embodiment of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised" or variants thereof are used in either the detailed description or the claims, such terms are intended to be inclusive in a manner similar to the term "comprising."

The present invention is directed to colored metalorganic fluids for electrowetting, electrofluidic, or electrophoretic devices. Electrowetting and electrofluidic devices are typically composed of hydrophobic dielectrics and electrodes, and may include other hydrophilic surfaces. In general, the substrates and connected features are exposed to a polar fluid and a non-polar fluid, with at least one being colored and including a metalorganic solvent having silicon and/or germanium, and which are not miscible or emulsifiable with each other. Electrophoretic devices typically include only colored non-polar fluids, which include charged particles. The polar and/or non-polar metalorganic fluids used in the devices of the invention can contain a modified, oligomeric and/or polymeric dye and can have attributes of specified electrical conductivity, as well as desirable viscosity, freezing point, and boiling point characteristics, and also reduce or eliminate performance-damaging ions that can exhibit a negative impact on dielectric substrate and other components of the devices. The modified, oligomeric, and/or polymeric dyes should not diffuse from one phase to the other or foul the surfaces of the device.

In accordance with embodiments of the present invention, the colored metalorganic fluid for use with electrowetting or electrofluidic devices can generally include at least one polar solvent including silicon and/or germanium, which defines a metalorganic solvent, at least one modified, oligomeric, and/or polymeric dye in the solvent, and optionally organic or inorganic pigments or surface modified pigments made by a method of chemical modification by covalently attaching ionic, nonionic, or polymeric groups to the pigment surface, as well as optionally a surfactant, synergist, additive for electrical conductivity control, dispersant, biocide, defoamer and other functional additives known those the skilled in the art. The modified, oligomeric, or polymeric dye has at least one chromophore attached to a low molecular weight group with molecular weight 10 to 800 or an oligomeric or polymeric chain, which includes silicon or germanium. The colored metalorganic fluid defines a colored metalorganic polar fluid.

In another embodiment, the colored metalorganic fluid for use with electrowetting, electrofluidic, or electrophoretic devices can generally include at least one non-polar solvent including silicon and/or germanium, which defines a metalorganic solvent, at least one modified, oligomeric, and/or polymeric dye in the solvent, and optionally organic or inorganic pigments or surface modified pigments made by method of chemical modification by covalently attaching nonionic low molecular weight, oligomeric, or polymeric groups to the pigment surface, as well as optionally a surfactant, synergist, dispersant, other additives known in the art, or any combination thereof. The modified, oligomeric, or polymeric dye has at least one chromophore attached to a low molecular weight group with molecular weight 10 to 800, or an oligomeric or polymeric chain, which includes silicon or germanium. The colored metalorganic fluid defines a colored metalorganic non-polar fluid.

The polar solvent of the invention may be an individual solvent, e.g., a metalorganic solvent, or any combination of two or more solvents. Non-limiting examples of the polar solvent include silicon or germanium based compounds, e.g. silicones, such as hydrophilic silicones, water, glycols, polyglycols, alcohols, polyols, ethers, esters, ketones, ketals, lactones, lactams, pyrrolidones and polyvinylpyrrolidones, pyrrolidines, carbonates, sulfones, sulfoxides, amines, amides, imines, nitriles, carboxylic acids, acetals, carbamates, ureas, aldehydes, halogenated, thio, or nitro compounds, ionic fluids, or any mixtures thereof. In one example, the polar solvent can be hydrophilic and include silicon and/or germanium.

The polar solvents may exhibit a dielectric constant greater than 10 at 25° C. In another example, the dielectric constant is greater than 30 at 25° C.

The dynamic viscosity of the polar solvent can be less than 2000 cP at 25° C. In another example, the dynamic viscosity is from 0.1 cP to 2000 cP at 25° C. In yet another example, the dynamic viscosity is from 0.1 cP to 500 cP at 25° C.

The polar solvent also can demonstrate an electrowetting relative response (EWRR) to direct or alternating current of 30V in the range of 20-80%. EWRR is defined here according to the following formula:

$$EWRR = (\Theta_0 - \Theta_V) \times 100 / \Theta_0, \%$$

wherein $\Theta_0$ is the initial contact angle at a voltage of 0V; $\Theta_V$ is the final contact angle at a voltage of 30V. A suitable procedure for measurement of contact angles is described in Balaji Raj et al., "Ion and Liquid Dependent Dielectric Failure in Electrowetting Systems", Langmuir |3b2|ver. 9|13/8/ 09, the contents of which is incorporated by reference herein in its entirety, and is further discussed in detail below under test procedures.

The non-polar solvent of the invention may be any solvent, including metalorganic solvents, or combination of two or more solvents. Non-limiting examples of non-polar solvents include non-substituted, substituted, linear, branched or cyclic compounds including silicon and/or germanium; aliphatic or aromatic hydrocarbons, partially hydrogenated aromatic hydrocarbons, alicyclic or aromatic heterocyclic compounds or derivatives thereof containing a halogen, nitro, nitroso, or cyano groups; fatty alcohols and carboxylic acids, and ethers, esters, and amides thereof. In one example, the non-polar solvent includes silicon and/or germanium. The non-polar fluid in the device can be immiscible with the polar fluid and the components dissolved in this liquid may not migrate into the polar liquid.

The non-polar solvents may exhibit a dielectric constant less than 10 at 25° C. In another example, the dielectric constant is less than 5 at 25° C.

The dynamic viscosity of the non-polar solvent can be less than 2000 cP at 25° C. In another example, the dynamic viscosity is from 0.1 cP to 2000 cP at 25° C. In yet another example, the dynamic viscosity is from 0.1 cP to 500 cP at 25° C.

For purposes herein, a modified dye is defined as a conventional or specially synthesized dye including one or more additional low molecular weight functional groups, with molecular weight 10 to 800, connected directly or through linking groups to a single chromophore by covalent or ionic bonds, with total molecular weight in a range of 100-4,000. The modified dye can also be a complex of two or more dyes connected to each other through covalent, ionic, or hydrogen bonds. These dyes may or may not have additional substituting groups; they can carry opposite charges and connect to each other directly or have the same charge and be connected through a third non-colored component having an opposite charge. The oligomeric dye is defined as a compound including at least one chromophore attached to one or more oligomeric chains directly or through linking groups by means of covalent or ionic bonds and having a total molecular weight in a range of 500 to 5,000. The polymeric dye is defined as a compound including at least one chromophore attached to one or more oligomeric and/or polymeric chains directly or through linking groups by means of covalent or ionic bonds and having a total molecular weight in a range of greater than 5,000 to 100,000.

The dyes of the present invention have a superior solubility in siliconorganic compounds. They can also be useful as dispersants for pigment dispersions based on metalorganic and other fluids providing improved colored silicon fluids for electrowetting, electrofluidic or electrophoretic chromatophore devices that can enhance device performance and maintain a desired function over a preferred period of time.

In one embodiment, the modified, oligomeric, or polymeric dyes of the invention can be defined by one or more of the following general formulas:

  (1)

  (2)

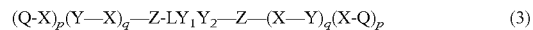  (3)

  (4)

  (5)

$$(Y)_l\text{—}X\text{-}Q\text{-}X\text{-}[Q\text{-}X]_k\text{-}Q\text{-}X\text{—}(Y)_l \quad (6)$$

$$[(Y)_l\text{—}X]_m\text{-}Q\text{-}X\text{—}Y\text{—}X\text{-}Q\text{-}[X\text{—}(Y)_l]_m \quad (7)$$

$$Q\text{-}X\text{—}Y\text{—}[X\text{-}Q\text{-}X\text{—}Y]_k\text{—}X\text{-}Q\text{-}X\text{—}Y \quad (8)$$

$$Y_2Y_1Y(\text{—}X\text{-}Q)[Y_1Y_2Y(\text{—}X\text{-}Q)]_kY_2Y_1Y(\text{—}X\text{-}Q)YY_1Y_2 \quad (9)$$

$$Y_2(B)Y_1(A)Y(\text{—}X\text{-}Q)[Y_2(B)Y_1(A)Y(\text{—}X\text{-}Q)]_kY_2(B)Y_1(A)Y(\text{—}X\text{-}Q)YY_1(A)Y_2(B) \quad (10)$$

$$Q\text{-}[X_1^-Y_1^+]_m \quad (11)$$

$$Q\text{-}[X_2^+Y_2^-]_m \quad (12)$$

$$[Y_1^+X_1^-]_m\text{-}Q\text{-}X\text{—}Y\text{—}X\text{-}Q\text{-}[X_1^-Y_1^+]_m \quad (13)$$

$$[Y_2^-X_2^+]_m\text{-}Q\text{-}X\text{—}Y\text{—}X\text{-}Q\text{-}[X_2^+Y_2^-]_m \quad (14)$$

$$[Y_1^+X_1^-]_m\text{-}Q\text{-}Z\text{-}(Q\text{-}Z)_k\text{-}Q\text{-}Z\text{—}[X_1^-Y_1^+]_m \quad (15)$$

$$[Y_2^-X_2^+]_m\text{-}Q\text{-}Z\text{-}(Q\text{-}Z)_k\text{-}Q\text{-}Z\text{—}[X_2^+Y_2^-]_m \quad (16)$$

$$Z\{X\text{—}Y\text{—}X\text{-}Q\text{-}[X_1^-Y_1^-]_m\}_p \quad (17)$$

$$Z\{X\text{—}Y\text{—}X\text{-}Q\text{-}[X_2^+Y_2^-]_m\}_p \quad (18)$$

$$Y_2Y_1Y(\text{—}X_1^{-+}X_2Q)[Y_1Y_2Y(\text{—}X_1^{-+}X_2Q)]_kY_2Y_1Y(\text{—}X_1^{-+}X_2Q)YY_1Y_2 \quad (19)$$

$$Y_2Y_1Y(\text{—}X_2^{+-}X_1Q)[Y_1Y_2Y(\text{—}X_2^{+-}X_1Q)]_kY_2Y_1Y(\text{—}X_2^{+-}X_1Q)YY_1Y_2 \quad (20)$$

Q represents a chromophore that can be selected from an azo or azo condensed compound, metal complexes, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethanes such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones, naphthaquinones, and anthraquinones; rhodamines, phthalocyanines, neutrocyanines, diazahemicyanines, porphirines, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones and any combinations thereof. Q can also represent a residue of any acid, direct, reactive, mordant, solvent, natural, disperse, basic (cationic), sulfur, fluorescent, optical brightener, or vat dye, or a pigment.

X represents R, RC(O)O, ROC(O), RC(O)NR$_1$, RNR$_1$C(O), SO$_2$NR$_1$, SO$_2$, RO, RS, RNR$_1$, =N—, RNHC(O)NR$_1$, RNHC(O)O, ROC(O)NH, OC(O)OCH$_2$NR$_1$, RC(O)OCH$_2$CH(OH)CH$_2$, RSO$_3^-$, ROSO$_3^-$, RCOO$^-$, ROPO$_3^{2-}$, RPO$_3^{2-}$, RR$_1$R$_2$R$_3$N$^+$, RR$_1$R$_2$R$_3$P$^+$, where R, R$_1$, R$_2$, and R$_3$ independently are hydrogen, alkyl, aryl, alkylaryl, alicyclic, or heterocycle.

Y represents a low molecular weight group with a molecular weight of 10 to 800, or a linear, branched, dendritic, or cyclic oligomeric or polymeric chain, which includes silicon and/or germanium. In one example, Y can include a silsesquioxane oligomeric or polymeric chain; —R$^1$R$^2$R$^3$SiO—(—SiR$^2$R$^3$O)$_r$—SiR$^2$R$^3$R$^4$; —R$^1$R$^2$R$^3$SiO—(—SiR$^2$R$^3$O)$_r$—SiR$^3$R$^2$R$^1$—; R$^2$R$^3$R$^4$SiO—(—SiR$^2$R$^3$O)$_r$—[Si(R$^3$—)R$^2$O—]$_n$—SiR$^2$R$^3$R$^4$; —R$^1$—Si [—O(—SiR$^2$R$^3$O)$_r$—SiR$^2$R$^3$R$^4$]$_3$, where R$^1$ is H, alkyl, halogenated alkyl, aryl or alkaryl; R$^2$, R$^3$ and R$^4$ are independantly alkyl, halogenated alkyl, aryl, alkaryl, alicycle, heterocyle, poly(alkylene oxide), alkylamine, polyalkylamine, or any combination thereof; r=1-2000, n=1-2000; and n+r<2000.

Y$_1$ and Y$_2$ are independently optional and can independently include a single bond, —R$^1$R$^2$R$^3$SiO—(—SiR$^2$R$^3$O)$_r$, —SiR$^3$R$^2$R$^1$—, a vinyl, vinylidene, or diene monomer or oligomer, polyanhydride, polyalkyleneglycol, polyester, epoxy, polyurethene, polyamide, polyimide, phenol, melamine, and urea formaldehyde, polycarbonate, polyacetal, polysulfone, polyaldehyde, or polyketone, where R$^1$, R$^2$, R$^3$, and r are as defined above. Y$_1$ and Y$_2$ together may also form a random or block co-polymer.

Z represents a radical of 1,3,5- and 1,2,4-triazine, benzene-1,3,5-tricarboxylic acid, benzene-1,2,4-tricarboxylic acid, benzene-2,3,5,6-tetracarboxylic acid, glycerol, pentaerythritol, dimethylol propionic acid, citric acid, isocitric acid, propane-1,2,3-tricarboxylic acid, mucic acid, malic acid, tartaric acid, 2,4-dihydroxybenzoic acid, 1,3,5-triaminobenzene, 1,3,5-trihydroxybenzene, gallic acid, 2-amino-1,3-propanediol, or triethanolamine.

L represents a single bond, a bifunctional linking group such as a residue of aliphatic, alicyclic, aromatic, or heterocyclic diols, diamines, dicarboxylic acids or their halogenides, diepoxy, diisocyanates, or disulfochlorides, or any combination thereof.

A and B are independently hydrogen, alkyl, aryl, alkyl aryl, heterocycle, vinyl, vinylidene, or diene monomer or oligomer, polyanhydride, polyalkyleneglycol, polyester, epoxy, polyurethane, polyamide, polyimide, phenol, melamine, urea formaldehyde, polycarbonate, polyacetal, polysulfone, polyaldehyde, or polyketone $X_1^-$ represents an anionic group of the chromophore, Q, such as sulfonic, phosphonic, carboxylic, or phenolic, and $X_2^+$ represents a cationic group of the chromophore, Q, such as ammonium, phosphonium, or sulfonium.

$Y_1^+$ represents a cationic group of the oligomer or polymer, such as ammonium, phosphonium, or sulfonium, and $Y_2^-$ represents an anionic group of the oligomer or polymer, such as sulfonic, phosphonic, carboxylic, or phenolic.

l is 1-2; m is 1-8; p and q are 1-4; p+q<5; and k is 0-500.

The dyes can include a total molecular weight in a range of 100-100,000.

In one example, the dye is an oligomeric dye defined by general formula (1), Q[X—(Y)$_l$]$_m$, where Q can be a residue of copper phthalocyanine, benzimidazolone, dioxazine, perylene, diketopyrrolopyrroles, quinacridone, or anthraquinone; X=SO$_2$NH, NR (where R is H), =N—, COO, or RC(O)OCH$_2$CH(OH)CH$_2$ (where R is H); l is 1; m is 1-3; and Y is —R$^1$R$^2$R$^3$SiO—(—SiR$^2$R$^3$O)$_r$—SiR$^2$R$^3$R$^4$ (where R$^1$ is propyl, R$^2$ and R$^3$ are methyl, R$^4$ is butyl, and r is 6 to 9) with a molecular weight from 800-1000. In another example, the dye is a fluorescent dye.

The dyes of the invention can be synthesized by reacting the following starting compounds:

Q-[X$_1$]$_m$, where X$_1$ represents RNHR$_1$; RCOOH; RCOCl; ROH, RSH, RSO$_2$Cl; RSO$_3$H; RHal; ROC(O)R$_1$Hal; RNHCOR$_1$Hal; R$_1$CH=CH$_2$; RNCO; RCHO, ROSO$_3$H, ROH$_2$PO$_3$, RH$_2$PO$_3$, RR$_1$R$_2$R$_3$N$^+$An$^-$, RR$_1$R$_2$R$_3$P$^+$An$^-$, epoxy, amide, imide, carboxylic acid anhydride, and any combination thereof, with Q, R, and R$_1$ as defined above, An is any anion, and Hal represents F, Cl, Br, or I.

Reactive monomers and oligomers, Y, Y$_1$, and Y$_2$, suitable for synthesis of the dyes of the invention can contain one or more vinyl, hydroxyl, carboxyl, anhydride, halogen, mercapto, alkoxy, epoxy, isocyanate, amide, imide, primary, secondary, tertiary or quaternary amino groups, or any combination thereof.

The dyes of the invention can be used as colorants for metalorganic materials, for example silicone or germanium fluids, as a shader for organic or inorganic pigments dispersed in metalorganic fluids, as dispersing and stabilizing agents for aqueous and non-aqueous pigment dispersions as described in U.S. Pat. Nos. 7,576,146; 7,329,315; 7,300,511; 6,926,768; 5,062,894; 5,145,997; 4,946,509; and WO 2007/005610, the contents of which are incorporated by reference herein in their entirety, or all of the above.

The dyes of the invention can be used for fluid coloration and as pigment dispersants immediately after synthesis without additional purification if the specified above conditions with respect to conductivity and ion content are fulfilled. However, purified dyes provide overall better fluid performance and more desirable long term device performance. Any appropriate techniques are suitable for purification of the oligomeric and polymeric dyes. Non-limiting examples include chromatographic separation, precipitation from solution by solvent replacement, extraction, sublimation, centrifugation, distillation, re-crystallization, fractional crystallization, ultrafiltration, reverse osmosis, or any combination thereof.

With respect to the solubility in the polar and non-polar solvents, the dyes of the invention demonstrate solubility of at least 5% by wt in the solvent. In another example, solubility is higher than 10% by wt. In yet another example, solubility is higher than 20% by wt. The dyes, in solution, should be stable at a wide temperature range from about $-40°$ C. to about $80°$ C.

The dyes can also contain additional functional groups. Non-limiting examples of these functional groups are alkyl, aryl, alkylaryl, halogen, nitro, nitrozo, cyano, thio, amino, alkylamino, hydroxyl, carboxylic, aldehyde, anhydride, amide, sulfonamide, salts of carboxylic and sulfonic acids, or any combination thereof.

The oligomeric and polymeric dyes utilized with the colored metalorganic polar fluids may contain polar groups; however, non-ionic polar groups are understood to be more desirable because they are less influenced by electrical field.

The modified, oligomeric, and polymeric dyes utilized with the colored metalorganic non-polar fluids should be devoid of any groups, ions/counter ions, or impurities that could increase conductivity of the fluid over $5 \times 10^{-3}$ μS/cm. Higher conductivity can have a negative effect on fluid and device performance.

The content of modified, oligomeric, and/or polymeric dyes in the colored polar or non-polar fluids can be in the range from about 0.01% weight to about 50% weight, based on the total weight of the fluid. Dye concentration below 0.01% weight may not provide the desired color intensity, and above 50% weight may result in very dark color and inadequate rheological behavior. In one example, the content of modified, oligomeric, and/or polymeric dyes in the polar or non-polar fluid is in a range from about 1% weight to about 30% weight.

The dyes can be useful for coloration of a wide variety of metalorganic compounds including, for example, high consistency silicone rubber (HCR); fluorosilicone rubber (FSR); liquid silicone rubbers (LSR); fluoro liquid silicone rubbers (F-LSR); conventional and high viscosity silicones for use as indicator or identification fluids; organic compatible, low temperature, and reactive silicone fluids; silicon foams; silicon elastomers and resins; hydraulic and thermo fluids; and other polymeric, oligomeric, or low molecular weight siliconorganic and germaniumorganic compounds. Non-limiting applications of the dyes include rubber wristbands, art molds, valves, room temperature vulcanization silicones, paints, caulks, sealants, adhesives, cases for electronic devices such as E-books and mobile phones, earplugs, watchstraps, gaskets, hoses, toys, tubing, tapes, keypads, molded artwork, gels, skin adhesives, antimicrobial and anti-fingerprint coatings, weather resistant textiles, screen print inks, and flexible impact protection.

The pigment that can be included in the polar and non-polar fluids can include any organic pigment belonging to an azo and azo condensed, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, naphthalimide, quinophthalone, isoviolanthrone, pyranthrone pigments, or carbon black, or any combination and solid solution thereof.

The pigment can be any inorganic pigment such as metal oxide, mixed metal oxide, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, bismuth vanadate, or derivatives thereof.

The pigment can also be any known extenders, for example carbonates, sulfates, or phosphates, and can be synthetic or mineral.

The pigment may also be a dispersed polymer, such as polystyrene, polyamides, polysulfones, or polysulfides. The pigment also can be any mixture of organic, inorganic pigments and extenders, and solid solutions thereof. In addition, the pigment may be any encapsulated organic or inorganic pigment or extender, or shell type pigment with inorganic nuclei covered with organic shell and vice versa.

The pigment may be a surface modified pigment made by methods of chemical modification by covalently attaching ionic, nonionic, or polymeric groups to the pigment surface. Non-limiting examples of modifying groups are carboxylic, sulfonic, phosphate, hydroxyl, primary, secondary, tertiary or quaternary amino, phosphonium, polyalkylenglycol, polyalkyleneimine, polyalkylene, polyamide, polyurethane, polyuria, and polyester-groups, or any combinations thereof.

Pigment particles can have a mean weight diameter from dynamic light scattering particle size analysis ranging from about 10 nm to about 5 μm. In another example, particle size is in a range of 20-300 nm.

The pigment content of the polar or non-polar fluid can be in the range from 0% weight to 50% weight, based on the total weight of the pigmented fluid. In one example, the pigment content is in the range from about 0.1 wt % to 50 wt %, based on the total weight of the colored metalorganic fluid. In another example, the pigment content is in the range from about 1 wt % to about 20 wt %, based on the total weight of the colored metalorganic fluid. Pigment concentrations below 0.1 wt % will usually not provide color contribution, and above 50 wt % will not electrowet effectively.

The dyes can be used individually or in any combination of two or more dyes. In one example, the combination of two or more black or non-black dyes is used to form a black colorant for polar or non-polar fluids. In another example, the combination of one or more black or non-black dyes with one or more black or non-black pigments is used to form a black colorant for polar or non-polar fluid. In still another example, the combination of one or more dyes, and optionally with one or more pigments, is used to form additional colors for polar or non-polar fluids, such as green, orange, brown, violet, etc.

The surfactant that can be included in the colored metalorganic fluid can be any anionic, cationic, catanionic, zwitterionic (amphoteric), non-ionic surfactant, or combinations thereof. The surfactant may be used for better dye solubility, colloid stabilization of pigment particles in fluid, to lower interfacial tension and thereby decrease the voltage required to cause electrowetting, and/or to increase conductivity of the fluid.

The colored metalorganic fluid may include the surfactant from 0% to 10% by weight of the pigment in the fluid.

The synergist that can be included in the colored metalorganic fluid may be sulfonic acid, a metal salt of sulfonic acid, a salt of sulfonic acid with primary, secondary, tertiary, and quaternary amines; a sulfonamide, phthalimidomethyl, arylmethyl, alkyl amine, carboxylic acid, salts, amides and esters of carboxylic acids; a carbonyl, amidomethyl, alkylaminomethyl, arylalkyloxy, phenylthio and phenylamino derivatives of azo, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, pyranthrone pigments, or any mixtures thereof. The synergist can also be any commercial or modified direct, acid, cationic, reactive, vat, sulfur, and disperse dye or any combination thereof. The synergist may be used for pigment surface modification to impart positive or negative charge on pigment surface, to stabilize pigment particles in the fluid, to improve rheological properties, and/or to increase conductivity of the fluid.

The colored metalorganic fluid may include the synergist from 0% to 30% by weight of the pigment in the fluid.

The dispersant that can be included in the colored metalorganic fluid may be selected from the following classes: anionic, cationic, zwitterionic (amphoteric), and/or non-ionic polymer that is block, random, comb polymer or co-polymer; or combinations thereof.

The dispersants, which may optionally be used with synergists, assist in stabilizing the pigment in the fluid and act as a counter ion. The colored metalorganic fluid may include dispersants from 0% to 200% by weight of the pigment in the fluid.

In one embodiment, an electrowetting or electrofluidic device includes a clear non-polar fluid and a colored metalorganic polar fluid, which is colored with a modified, oligomeric, and/or polymeric dye having at least one chromophore attached to a low molecular weight group with molecular weight 10 to 800 or an oligomeric or polymeric chain, which includes silicon and/or germanium. In another embodiment, an electrowetting or electrofluidic device includes a clear polar fluid and a colored metalorganic non-polar fluid, which is colored with a modified, oligomeric, and/or polymeric dye having at least one chromophore attached to a low molecular weight group with molecular weight 10 to 800 or an oligomeric or polymeric chain, which includes silicon and/or germanium. In still another embodiment, an electrowetting or electrofluidic device includes colored metalorganic polar and colored metalorganic non-polar fluids, with each colored with a modified, oligomeric, and/or polymeric dye having at least one chromophore attached to a low molecular weight group with molecular weight 10 to 800 or an oligomeric or polymeric chain, which includes silicon and/or germanium and does not diffuse into the other.

In yet another embodiment, the colored metalorganic fluid includes at least one polar or non-polar solvent including silicon and/or germanium, at least one modified, oligomeric, and/or polymeric dye having at least one chromophore attached to a low molecular weight group, or an oligomeric or polymeric chain, which includes silicon and/or germanium, in the solvent, and at least one pigment, which is stabilized by the dye of the invention, wherein the pigment has a mean weight diameter in a range of 10-400 nm. In another example, the pigment has a mean weight diameter in a range of 20-200 nm. In yet another example, the polar or non-polar solvent is a metalorganic solvent, which is defined by a hydrophobic compound or a hydrophilic compound including silicon and/or germanium.

In another embodiment, a plurality of colored metalorganic fluids can be combined together. For example, a colored metalorganic fluid having a polar solvent including silicon and/or germanium and a modified, polymeric, and/or oligomeric dye having at least one chromophore attached to a low molecular weight group, or an oligomeric or polymeric chain, which includes silicon and/or germanium, in the polar solvent may be combined with a colored metalorganic fluid having a non-polar solvent including silicon and/or germanium and a modified, polymeric, and/or oligomeric dye having at least one chromophore attached to a low molecular weight group or an oligomeric or polymeric chain, which includes silicon and/or germanium in the non-polar solvent, with each including additional optional components as discussed above.

The colored metalorganic polar fluid may have an electrical conductivity no greater than 3000 $\mu$S/cm. In another example, the colored polar fluid may have an electrical conductivity in a range from about 0.01 $\mu$S/cm to 1000 $\eta$S/cm. In another example, the colored metalorganic polar fluid has an electrical conductivity from about 0.1 $\mu$S/cm up to 100 $\mu$S/cm. In yet another example, the colored metalorganic polar fluid has an electrical conductivity of about 0.5 $\mu$S/cm up to about 50 $\mu$S/cm. If conductivity is too low, a higher voltage has to be applied for proper device function. If conductivity is too high, the probability of dielectric breakdown is increased.

If necessary, conductivity can be readily adjusted by the addition of appropriate salts; however, the total concentration of any present monatomic ions with radii smaller than 2.0 Å and polyatomic ions smaller than 1.45 Å should not exceed 500 ppm total to prevent electrical breakdown of a dielectric in the device employing the fluid, at an applied voltage up to three times the theoretical operating voltage of the dielectric, which is further discussed below. In one example, the content of specified ion species should not exceed 300 ppm total. In still another example, the content of specified ion species should not exceed 100 ppm total.

In addition, the colored metalorganic polar fluid has a surface tension from about 15 dynes/cm to about 90 dynes/cm at 25° C. In another example, the surface tension is from about 25 dynes/cm to about 75 dynes/cm at 25° C.

The conductivity of the colored metalorganic non-polar fluid should not exceed the value of about $5 \times 10^{-3}$ $\mu$S/cm insofar as higher conductivity can be detrimental for fluid and device performance.

The colored metalorganic fluids can exhibit stability in a temperature range of −40° C. to 80° C. In one example, the stability lasts at least four weeks.

The dynamic viscosity of the colored metalorganic fluids can be from 0.5 cPs to 2,000 cPs at 25° C. In another example, the dynamic viscosity is from 1 cPs to 500 cPs at 25° C. In still another example, the dynamic viscosity is from 1 cPs to 100 cPs at 25° C.

The interfacial tension between the polar fluid and the non-polar fluid can be from about 2 to about 70 dynes/cm. In another example, the interfacial tension between the polar fluid and the non-polar fluid can be about 5 to about 55 dynes/cm. If interfacial tension is too low, mixing of the polar fluid and non-polar fluid will occur, and if too high, higher voltages will be required for electrowetting response.

The colored metalorganic fluids having the non-polar solvent should not be miscible with the colored metalorganic fluids having the polar solvent, and should not form a stable emulsion therewith. To that end, the non-polar solvent should have a cross-solubility level with the polar solvent that is less than about 10%. In one example, the cross-solubility is less than about 1%. In addition, components of the colored polar fluid should not migrate into the colored metalorganic non-polar fluid or vice versa.

In preparing the colored metalorganic fluids, the components can be mixed in a vessel equipped with a high-speed stirrer with rotation velocity in a range of 500-12,000 RPM. The mixture may then be milled utilizing known milling equipment, such as but not limited to a rotating ball mill, vibration mill, agitated horizontal or vertical media mill, basket mill, rotor/stator type machines, or attritors. The mixture may be milled by batch operation or by way of recirculation and/or discrete pass. Any known type and size of media can be employed, for example, glass, ceramics, sand, polymeric, and metal media with sizes in a range from 15 µm to about 10 cm. Typical mills include those manufactured by Eiger, Netzsch, Buhler, Premier, Hockmeyer, Chicago Boiler, Drais, Union Process, etc. Alternatively, the colored metalorganic fluids may be produced on batch process equipment, such as a rotating ball mill or an agitated ball mill. The former is typified by those provided by Paul-O-Abbe; the latter is typified by those supplied by Union Process. Media size for either may range in size as noted above, and media shape may be circular, regular, irregular, or a mixture thereof. The colored metalorganic fluids may also be prepared on any high-energy disperser with a shear mechanism, such as an IKA Works, Baker-Perkins, sigma blade mixer, etc. The colored metalorganic fluids may optionally be filtered or/and centrifuged to remove large pigment particles, broken media, or contaminants. Other methods of preparation known in the art can also be employed.

The viscosity of the colored fluids is measured with a Brookfield Viscometer LVDV-II+Pro at T=25° C., rotation speed 30 RPM, and spindle number 18. Particle size distribution is determined using Nanotrac™ 250, NPA 250 (Microtrac, Inc.) and Microtrac™ UPA (Microtrac, Inc.). Interfacial tension for colored metalorganic fluids is measured using a drop tensiometer IFT Tracker™ (Teclis). The tensiometer uses drop shape analysis to calculate surface tension or interfacial tension where drop shape is determined by the forces of surface tension and gravity acting on the drop. Either a pendant drop or a rising drop configuration is used; the configuration was determined by the specific gravities and optical characteristics of fluids. The dielectric constant is measured at 25° C. using a Scientifica 870 Liquid Dielectric Constant Meter (Princeton Instruments).

The electrical conductivity for colored metalorganic fluids was measured at 25° C. with a conductivity meter capable of measuring the desired range of conductivity, for example VWR model number 23226, Oakton® Acorn Con 6, and Liquid Conductivity Picosiemens/Meter, Model L40 (Wolfson Electronics)

Colored metalorganic fluids were tested for electrowetting capability by evaluating change in contact angle on a hydrophobic dielectric and electrode substrate with voltage application. Indium tin oxide (ITO) coated glass was covered with a combination of Parylene C dielectric and Cytonix Fluoropel 1601V hydrophobic fluoropolymer as the ambient. Alternately, the dielectric layer may consist of $Al_2O_3$ and Asahi Cytop CTL-809M hydrophobic fluoropolymer. A conductive wire attached at one point to the ITO layer of the substrate served as the ground electrode. The substrate was submerged in a transparent non-polar solvent and a drop of colored metalorganic fluid having a polar fluid was placed on the surface. Direct or alternating current in increments of 2V was supplied to the drop through a tungsten cat whisker probe and the contact angle of the drop at each voltage was recorded and calculated using VCA Optima software program (AST Products). A fluid was considered electrowetting capable if the contact angle decreased upon application of voltage so that the final contact angle was less than 90°. See Balaji Raj et al., "Ion and Liquid Dependent Dielectric Failure in Electrowetting Systems", Langmuir |3b2|ver.9|13/8/09, the contents of which is incorporated by reference herein in its entirety. In addition, colored metalorganic polar fluids were measured without conductivity adjustment provided fluid conductivity was not less than 25 µS/cm.

Colored fluids were also tested for their tendency to cause dielectric failure, also referred to as dielectric breakdown. The probability of dielectric failure or breakdown might greatly increase in a presence of small ionic species in the colored fluid which could migrate into or/and through a dielectric layer. The $SnO_2:In_2O_3$ coated glass was covered with a thin dielectric layer, which may be $Al_2O_3$ with Asahi Cytop fluoropolymer or Parylene with FluoroPel fluoropolymer. A 1 µL drop of the fluid to be tested was placed on the substrate and a tungsten probe was positioned in the drop. Current was measured while completing direct current (DC) voltage sweeps from −99 V to 99 V. Dielectric failure was indicated by a current greater than 1 µA or an exponential increase in current. See Balaji Raj et al., "Ion and Liquid Dependent Dielectric Failure in Electrowetting Systems", Langmuir |3b2|ver.9|13/8/09, the contents of which is incorporated by reference herein in its entirety. For the purpose of this invention, the fluid was considered to pass the test if dielectric breakdown did not occur at an applied voltage up to three times the theoretical operating voltage for the desired dielectric. Three to five drops were tested for each solution for repeatability. For some examples, the worst result for each solution was presented.

The theoretical operating voltage for a dielectric was calculated with the following equation, using an IFT value of 7 dynes/cm, an electrowetting angle of 75 degrees, and a Young's angle of 180 degrees.

$$V_O = \sqrt{\frac{(\cos(\theta_V) - \cos(\theta_Y)) * 2 * \gamma_{NP} * d}{\varepsilon_0 * \varepsilon_r}}$$

Where $V_O$ is the operating voltage, $\theta_V$ is the electrowetting angle, $\theta_Y$ is the Young's angle, $\gamma_{NP}$ is the interfacial tension between the polar and non-polar fluids, $\varepsilon_0$ is the permittivity constant, $\varepsilon_r$ is the relative dielectric permittivity, and d is the thickness of the dielectric. The colored fluid should not result in dielectric breakdown as tested with the specified method at an applied voltage up to three times the theoretical operating voltage for the desired dielectric as calculated hereby.

Ion content was measured by elemental analysis using inductively coupled plasma spectroscopy (ICP). Samples were prepared for metal content by digestion in concentrated nitric acid and then by dilution to 5% acid concentration in deionized water. The sample was then introduced to a Thermo Scientific iCAP 6000 ICP-OES instrument to identify and quantify the total elemental content including non-ionic species of metals, metalloids, and non-metals such as phosphorus, sulfur and selenium. When the content of such elements, including but not limited to sodium, magnesium, calcium, iron, aluminum, and potassium, is determined by ICP, the upper limit of the total element content is established by summation. Ion content as defined here is known to be lower than the elemental analysis, thus establishing the upper limit of the ionic content. In addition, total halogen (bromine, chlorine) content was determined by oxidation. To determine total halogen, the sample was oxidized in a Schöniger Oxidation Flask and the evolved halogen was absorbed into an alkali solution. The halogen was then precipitated from this solution and determined gravimetrically. Polyatomic ions can be measured through common analytical techniques specific to the ionic species. These include but are not limited to pH, titrimetric methods, colorimetric methods, spectroscopic methods, gravimetric methods, or/and mass spectrometry.

EXAMPLES

The following examples illustrate details of the present invention and are not intended to limit the spirit and the scope of the invention. Unless otherwise indicated, % and parts always denote % and parts by weight.

Example 1

Yellow Oligomeric Dye for Non-Polar Fluid 10 parts of 2-(4-carboxyphenylazo)acetoacetanilide and 80 parts of dichloroethane were mixed under nitrogen purge. 10 parts of thionyl chloride and 0.3 parts of dimethylformamide were then added. The reaction mixture was heated up to 80° C. and maintained at this temperature for three hours. The excess of thionyl chloride and the solvent were removed by distillation. After cooling down to ambient temperature, 150 parts of chloroform, 30.8 parts of monoaminopropyl terminated polydimethylsiloxane MCR-A11 (available from Gelest), and 4.8 parts of pyridine were added and the reaction mass was stirred at 25° C. for 3 hours. Then, the mixture was heated to 60° C. and stirred for one hour, then cooled to ambient temperature. After cooling to ambient temperature, the chloroform solution was washed with 1% hydrochloric acid, then four times with distilled water. The chloroform was distilled under vacuum to yield a waxy, yellow solid. The yellow colored oligomeric dye was identified as 4-[(E)-(2,4-dioxopentan-3-yl)diazenyl]-N-polydimethylsiloxane-benzamide (Mw=1100 to 1300, yield=93% of theoretical), which corresponds to formula (1) $Q[X—(Y)_l]_m$, where Q is a monoazo dye residue; X is CONH; l is 1; m is 1, and Y is a polydimethylsiloxane. The solubility of the oligomeric dye in silicone oil Dow Corning® OS-30 (available from Dow Corning) was at least 20% by wt.

Example 2

Red Oligomeric Dye for Non-Polar Fluid 7 parts of C.I. PR264 (available from Sun Chemical) was added slowly to 100 parts of chlorosulfonic acid at 5-10° C. and stirred for one hour at 10° C. 7 parts of thionyl chloride was added and the reaction mass stirred at 25° C. for 30 minutes. The mixture was added drop-wise to a mixture of ice and water, and formed a suspension of sulfonyl chloride, was filtered and then washed with ice water. The press-cake of sulfonyl chloride was immediately added to a mixture of isopropanol (200 parts), ice, 3.4 parts of sodium carbonate, and 25 parts of monoaminopropyl terminated polydimethylsiloxane MCR-A11(available from Gelest) for 30 minutes. The resulting slurry was stirred at 0-5° C. for one hour, heated up to 25° C. and stirred for one more hour, then one hour at 50° C., and then 4 hours at 80° C. A dark red, waxy material was filtered, washed with water to a neutral reaction, washed with isopropanol, and dried at 75° C. overnight. The yield was 86% of a theoretical calculation based on a 1.5 substitution level. The dye was identified as 3,6-bis(4-biphenyl)-2,5-dihydropyrrolo[3,4-c]pyrrolo-1,4-dione-N-polydimethylsiloxane-sulfonamide (Mw=1,300-2,600), which corresponds to formula (1) $Q[X—(Y)_l]_m$, where Q is a diketopyrrolopyrrole pigment residue; X is $SO_2NH$; l is 1; m is 1.5, and Y is a polydimethylsiloxane. The dye was readily soluble in silicone oils demonstrating very intense red color. The solubility of the oligomeric dye in silicone oil Dow Corning® OS-30 was at least 10% by wt.

Example 3

Red Oligomeric Dye for Non-Polar Fluid 110 parts of monoaminopropyl terminated polydimethylsiloxane MCR-A11 (available from Gelest), 12.5 parts of quinizarine, and 12.3 parts of leucoquinizarin were mixed for 20 minutes under nitrogen, heated to 70° C., and stirred for two hours. The temperature was raised to 130° C. and the mixture stirred for two hours without nitrogen flow, then stirred for four hours at 150° C. At this point, no particles of starting materials were detected and the color of the reaction mass changed from orange to dark bluish red. The hot fluid was discharged from the reactor. The oligomeric dye was identified as 1-hydroxy-4-(aminopolydimethylsiloxane)anthracene-9,10-dion (mw=1100 to 1300), which corresponds to formula (1) $Q[X—(Y)_l]_m$, where Q is an anthraquinone residue; X is NH; l is 1; m is 1, and Y is a polydimethylsiloxane. The solubility of the oligomeric dye in silicone oil Dow Corning® OS-30 was at least 20% by wt.

Example 4

Red Oligomeric Dye for Non-Polar Fluid

In a four necked flask, 5.0 parts of 3,4,9,10-perylene tetracarboxylic acid dianhydride, 0.6 parts of zinc acetate dihydrite, 26 parts of monoaminopropyl terminated polydimethylsiloxane MCR-A11 (available from Gelest), and 150 parts of N-methylpyrrolidone were charged. The reaction mixture was heated to 170° C. under nitrogen flow, stirred for 6 hours, and then stirred for 6 hours at 185° C. After cooling down to ambient temperature, a dark red liquid was discharged from the reactor and transferred into 500 parts of water. The product was collected by filtration, washed with water, then re-slurred in a mixture of distilled water and isopropanol, 80/20, and caustic. The slurry was heated up to 65° C. and stirred for one hour. The product was isolated by filtration and washed with distilled water until the filtrate became clear, then dried at 60° C. The oligomeric dye was identified as perylenetetracarboxylic acid-bis-(polydimethylsiloxane)-imide (Mw=2000 to 2400), which corresponds to formula (1) $Q[X—(Y)_l]_m$, where Q is a perylene pigment residue; X is =N—; l is 1; m is 2, and Y is a polydimethylsiloxane. The solubility of the oligomeric dye of the example in silicone oil Dow Corning® OS-30 was at least 20% by wt.

Example 5

Violet Oligomeric Dye for Non-Polar Fluid 30 parts of bis(monoaminopropyl terminated) polydimethylsiloxane DMS-A12 (available from Gelest), 6.0 parts of quinizarine, 6.1 parts of leucoquinizarin, and 168 parts of silicone oil Dow Corning® OS-30 were mixed for 20 minutes under nitrogen, heated up to 70° C., and stirred for two hours at 70° C. Then the temperature was raised to 130° C., and the mixture stirred for two hours without nitrogen, then for eight hours at 140° C. At this point, no particles of starting materials were detected and the color of the reaction mass changed from orange to dark bluish red. 5.2 parts of benzyl amine was added, the mixture stirred for six hours at 150° C. without nitrogen flow, then eight hours. A bright violet colorant was discharged from the reactor and filtered. The oligomeric dye was identified as bis[1-benzamine-4-aminoanthracene-9,10-dion]polydimethylsiloxane, (Mw=1,400-1,600), which corresponds to formula (4) Q-X—$YY_1Y_2$—X-Q, where Q is an anthraquinone residue; X is NH; Y is a polydimethylsiloxane, and $Y_1$ and $Y_2$ did not exist. The solubility of the oligomeric dye in silicone oil OS-30 was at least 25% by wt. The solution of the dye in Dow Corning® OS-30 was purified by multiple consecutive extractions with distilled water and propylene glycol.

Example 6

Blue Oligomeric Dye for Non-Polar Fluid 10 parts of C.I. PB 15:3 (available from Sun Chemical) were added slowly over 15 min to 60 parts of chlorosulfonic acid at 25° C., then the mixture was heated to 100° C. and stirred for three hours. The mixture was cooled to 80° C., 10.2 parts of thionyl chloride was added, then the reaction mass was stirred for 30 minutes. After cooling down to room temperature, the reaction mass was added drop-wise to a mixture of ice and water. A suspension of sulfonyl chloride was filtered out, washed with ice water, and immediately added to a mixture of 150 parts of water, 50 parts of isopropanol, 50 parts of ice, 4.2 parts of sodium carbonate, and 14 parts of monoaminopropyl terminated polydimethylsiloxane MCR-A11 (available from Gelest) for 30 minutes. The resulting slurry was stirred at 0-5° C. for one hour, heated to 25° C. and stirred one more hour, stirred one hour at 50° C., and then 4 hours at 80° C. A dark blue, waxy material was filtered, washed with water to neutralize the reaction, and dried at 75° C. overnight. The yield was 88.3% of the theoretical calculated on substitution level 1.4. The substitution level was determined with IR-spectroscopy. The oligomeric dye was identified as copper phthalocyanino-N-polydimethylsiloxane-sulfonamide, (Mw=1,800-3,600), which corresponds to formula (1) Q[X—$(Y)_l]_m$, where Q is a phthalocyanine pigment residue; X is $SO_2NH$; l is 1; m is 1.4, and Y is a polydimethylsiloxane. The dye was readily soluble in silicone oils demonstrating very intense blue color. The solubility of the oligomeric dye in silicone oil Dow Corning® OS-30 was at least 10% by wt.

Example 7

Black Oligomeric Dye for Non-Polar Fluid 7.75 parts of dry C.I. Direct Black 19 (available from Sensient) was dissolved in 100 parts of thionyl chloride and the mixture refluxed for two hours. Then the reaction mass was stirred at ambient temperature overnight and added to a mixture of water and ice. A black precipitate was isolated by filtration and washed with cold water, then reacted immediately with 20 parts of monoaminopropyl terminated polydimethylsiloxane MCR-A11 (available from Gelest) and 8 parts pyridine at 20° C. for 0.5 hour and then at 50° C. for two hours. The precipitate was isolated by filtration, washed with 5% caustic until the filtrate was clear, washed with water to pH=7-8, and then dried to constant weight. The yield was 81% of black solid, which is readily soluble in silicone oils demonstrating intense bluish black color. The oligomeric dye was identified as 4-amino-3,6-bis4-(2,4-diaminophenyl) azophenylazo-5-hydroxy-2,7-N,N-polydimethylsiloxane-sulfonamide (Mw=2300 to 2700), which corresponds to formula (1) Q[X—$(Y)_l]_m$, where Q is a tetraazo dye residue; X is $SO_2NH$; l is 1; m is 2, and Y is a polydimethylsiloxane. The solubility of the oligomeric dye in silicone oil Dow Corning® OS-30 was at least 10% by wt.

Example 8

Black Oligomeric Dye for Polar Fluid 1.55 parts of C.I. Direct Black 19 (available from Sensient) was dissolved in a mixture of 20 parts of ethanol and 80 parts of DI water, and then 4 parts of monoaminopropyl terminated polydimethylsiloxane MCR-A11(available from Gelest) and 3 parts of hydrochloric acid were added. The resulting slurry was stirred one hour at ambient temperature, filtered, and washed with distilled water. The yield was 93% of black solid, which is readily soluble in lower alcohols demonstrating intense bluish black color. The oligomeric dye was identified as 4-amino-3,6-bis4-(2,4-diaminophenyl)azophenylazo-5-hydroxy-2,7-Naphthalenedisulfonic acid dipolydimethylsiloxane salt (Mw=2400 to 2800), which corresponds to formula (11) Q-$[X_1^-Y_1^-]_m$, where Q is a tetraazo dye residue; $X_1^-$ is $SO_3^-$; $Y_1^+$ is a monoaminopropyl terminated polydimethylsiloxane; l is 1; m is 2.

Example 9

Black Pigmented Non-Polar Metalorganic Fluid Stabilized with Blue Oligomeric Dye 10 parts of C.I. Black (available from Evonik, tradename: Nipex® 150), 6 parts of the oligomeric dye of Example 6, and 84 parts of silicone oil Dow Corning® OS-30 were premixed and then milled for three hours in an Eiger® mill with 0.8 mm zirconium media. Average particle size was 150 nm.

The 5% fluids made with colorants of Examples 1-7 and 9 and silicone oil Dow Corning® OS-30 demonstrated a satisfactory electrowetting performance and did not cause breakdown of dielectric at direct current (DC) voltage sweeps from −99 V to 99 V.

The various embodiments of the colored metalorganic fluids of the invention may be used to supply coloration in electronic displays that operate by principles of electrowetting, electrofluidics, and/or electrophoresis, in color filters, in inkjet inks, in liquid toners, and in developers. In one specific embodiment, the colored metalorganic fluids of the embodiments of the invention may be used in a display that operates according to electrowetting principles to create an image. Generally, an electrowetting device contains a plurality of individual pixels which are filled with a polar fluid and a non-polar fluid, which are immiscible. A voltage applied to, or removed from, each pixel causes movement of the polar fluid and thereby changes the appearance or state of the pixel from, for example, a colored state to a non-colored or transparent state.

Figure 1B:
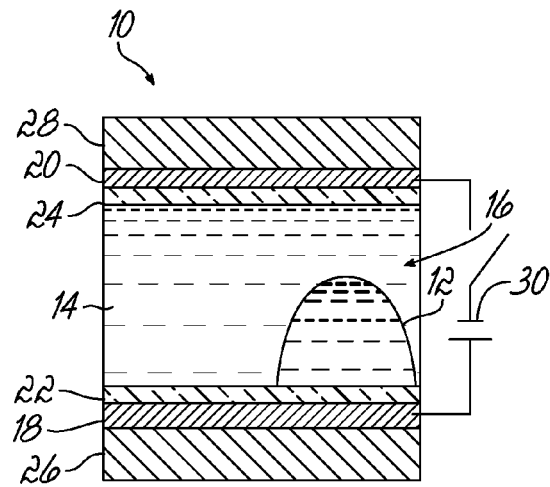
FIG. 1B is a diagrammatic cross-sectional view of the electrowetting device of FIG. 1A in which the display state of the pixel is altered.

A representative pixel 10 for use as an electrowetting device in a display is shown as an embodiment of the invention in FIGS. 1A and 1B. A polar fluid 12 including at least one polar solvent and at least one modified, oligomeric, or polymeric dye consistent with one of the embodiments of the invention and a non-polar fluid 14 are confined inside a reservoir 16. The reservoir 16 is disposed between a first electrode 18 and a second electrode 20. Each of the electrodes 18, 20 is coated by a respective hydrophobic coating 22, 24 composed of an insulator, such as a fluoropolymer. The fluids 12, 14, electrodes 18, 20, and coatings 22, 24 in the stacked arrangement are supported by substrates 26, 28. A voltage source 30 is connected between the electrodes 18, 20 and is further connected with a control circuit (not shown) for the pixels of the display so that the pixel 10 can be addressed to change display states.

Light is supplied to the substrate 26 and directed through the stack of fluids 12, 14, electrodes 18, 20, coatings 22, 24, and substrate 28 to the environment exterior to the pixel 10. In the presence of a voltage applied by the voltage source 30 to the electrodes 18, 20 as shown in FIG. 1A, the polar fluid 12 forms a film over the hydrophobic coating 22 such that the pixel 10 has a visual appearance related to the coloration of the film. For example, if the polar fluid 12 is red in color, the light of a red wavelength is observed from the pixel 10. The color of polar fluid 12 is manifested in the light transmitted through the pixel 10 because of the increased surface area of the polar fluid 12 over the area of hydrophobic coating 22. When the potential difference is removed as shown in FIG. 1B, the polar fluid 12 responds by changing its shape and, thereby, its contact angle relative to the surface of the hydrophobic coating 22. The visible coloration of the polar fluid 12 is less apparent in the display state of FIG. 1B because less of the light is transmitted through the polar fluid 12 and, by comparison, more of the light is transmitted through the non-polar fluid 14. The non-polar fluid 14, which lacks the coloration of the polar fluid 12, preferentially wets most of the surface area of the hydrophobic coating 22 when the voltage is absent from the electrodes 18, 20 in FIG. 1B. The non-polar fluid 14 may be non-colored or transparent. These two contrasting display states of the pixel 10 shown in FIGS. 1A, 1B, along with contrasting display states of other pixels (not shown) similar to pixel 10, may be used by the display to generate an image. When the potential difference is re-applied between the electrodes 18, 20 of the pixel 10, the polar film 12 will return from the display state of FIG. 1B to the display state of FIG. 1A.

A person having ordinary skill in the art will appreciate that the pixel 10 may have various alternative constructions and that the construction shown in FIGS. 1A, 1B may vary. In an alternative embodiment, the pixel 10 may be configured such that the applied potential difference causes the polar fluid 12 to form a film as in FIG. 1A and removal of the applied potential difference produces the state of increased contact angle in FIG. 1B. Alternatively, the polar fluid 12 may be moved by the potential difference to a position within the pixel 10 at which the polar fluid 12 is not visible and hidden from an observer.

Figure 2A:
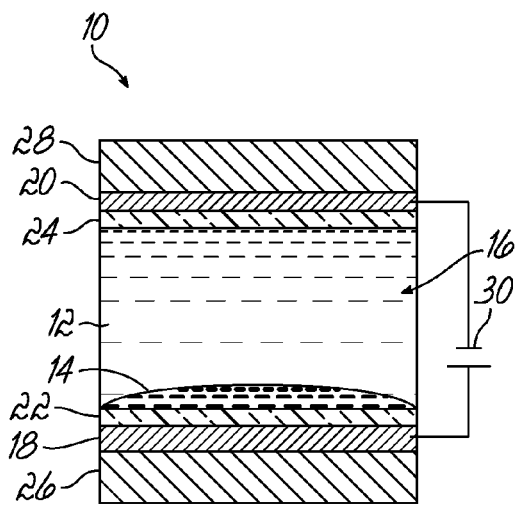
FIG. 2A is a diagrammatic cross-sectional view of an electrowetting device operating as a display pixel in accordance with an embodiment of the invention.
Figure 2B:
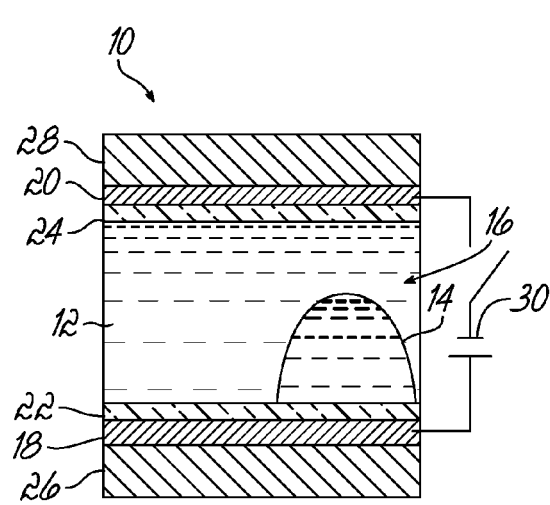
FIG. 2B is a diagrammatic cross-sectional view of the electrowetting device of FIG. 2A in which the display state of the pixel is altered.

With reference to FIGS. 2A and 2B in which like reference numerals refer to like features in FIGS. 1A, 1B, a non-polar fluid 14, which includes at least one non-polar solvent and at least one modified, oligomeric, or polymeric dye consistent with one of the embodiments of the invention, may have a coloration, e.g., black, and may be used in the display pixel 10 along with the polar fluid 12 to create an image. In one embodiment, the black colored non-polar metalorganic fluid 14 forms a film over the hydrophobic coating 22 as shown in FIG. 2A, which creates a dark, e.g., black, image area. When a potential difference is applied as in FIG. 2B, polar fluid 12 will wet the hydrophobic coating 22, and the non-polar 14 will be moved to, for example, form a droplet characterized by a decreased surface area. As a result, the color of the non-polar fluid 14 is confined to a small visible area of the pixel 10 and the appearance of the pixel 10 will primarily reflect the coloration of the polar fluid 12, which will be non-colored or transparent. These two contrasting display states of the pixel 10 shown in FIGS. 2A, 2B, along with contrasting display states of other pixels (not shown) similar to pixel 10, may be used by the display to generate an image.

Figure 3A:
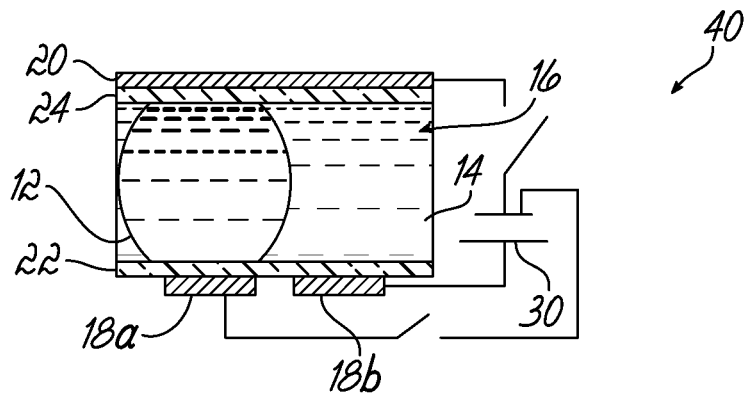
FIG. 3A is a diagrammatic cross-sectional view of an electrowetting device operating as a display pixel in accordance with an embodiment of the invention.
Figure 3B:
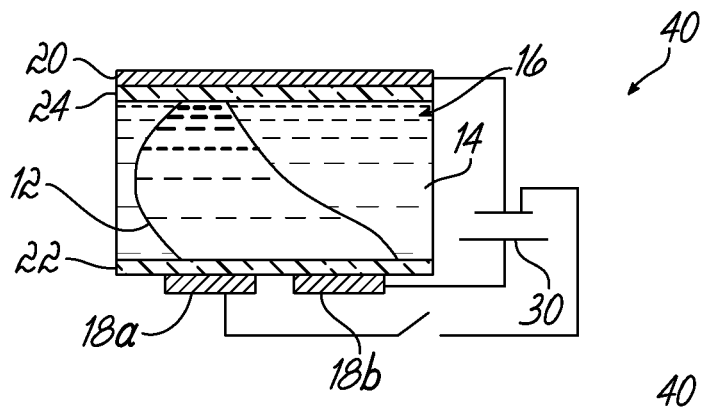
FIG. 3B is a diagrammatic cross-sectional view of the electrowetting device of FIG. 3A in which the display state of the pixel is being altered.
Figure 3C:
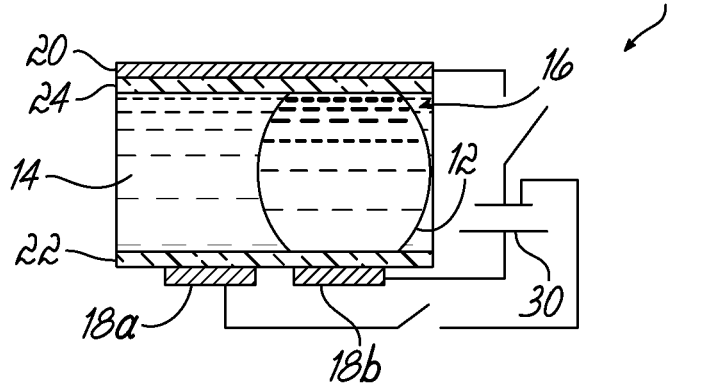
FIG. 3C is a diagrammatic cross-sectional view of the electrowetting device of FIG. 3A in which the display state of the pixel is altered.

With reference to FIGS. 3A-C in which like reference numerals refer to like features in FIGS. 1A, 1B and in accordance with an embodiment of the invention, the polar fluid 12 of the embodiments of the invention may be used in a pixel 40 of a display in which a droplet of the polar fluid 12 is moved within the pixel 40 from a non-visible position (FIG. 3A) to a visible position (FIG. 3C). Substrates similar to substrates 26, 28 are present but are omitted from the views for clarity. The transition of the polar fluid 12 between the non-visible and visible positions is apparent in FIG. 3B. The electrode 18 of pixel 40 is segmented into two discrete electrodes 18a, 18b. Electrode 18a is located in a portion of the pixel 40 for which the polar fluid 12 is hidden and not visible to an observer and electrode 18b is located in a portion of the pixel 40 for which the polar fluid 12 is visible to an observer due to the transmission of light through the polar fluid 12.

By switching the potential difference applied between the electrodes 18b, 20, the polar fluid 12 is moved from the non-visible position (FIG. 3A) to the visible position (FIG. 3B). In the visible position, light is transmitted through the polar fluid 12 and acquires a wavelength that reflects the coloration of the polar fluid 12. The light, after acquiring the characteristic coloration, is transmitted through the hydrophobic coating 24 and electrode 20 and out of the pixel 40 to an observer. The polar fluid 12 is returned from the visible position (FIG. 3C) to the non-visible position (FIG. 3 A) to reestablish the initial display state by application of a potential difference to electrodes 18a, 20.

These two contrasting display states of the pixel 40 shown in FIGS. 3A, 3C, along with contrasting display states of other pixels (not shown) similar to pixel 40, may be used by the display to generate an image. In an alternative embodiment, the non-polar fluid 14 of the pixel 40 may be colored in addition to the coloration of the polar fluid 12. The embodiments of the polar fluid 12 described herein may be used in a device pixel, such as pixel 40, to improve image contrast.

Figure 4A:
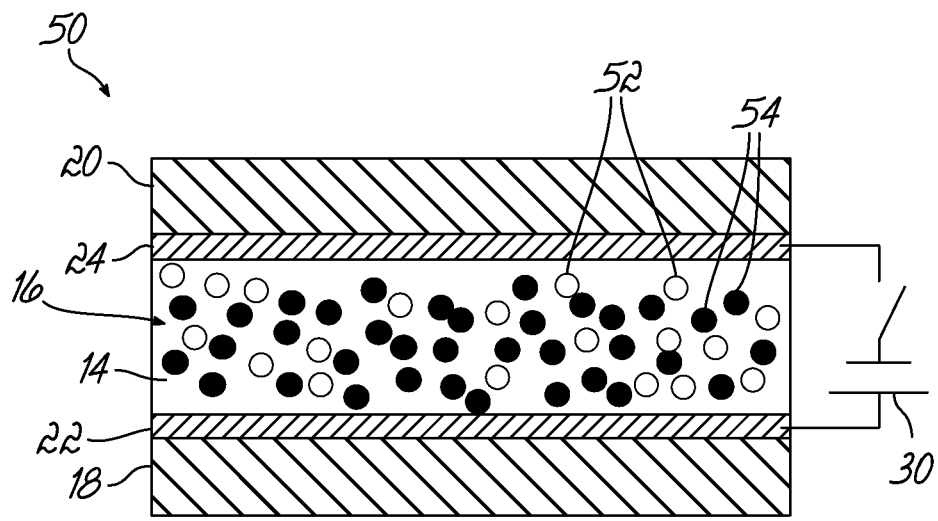
FIG. 4A is a diagrammatic cross-sectional view of an electrophoretic device operating as a display pixel in accordance with an embodiment of the invention.
Figure 4B:
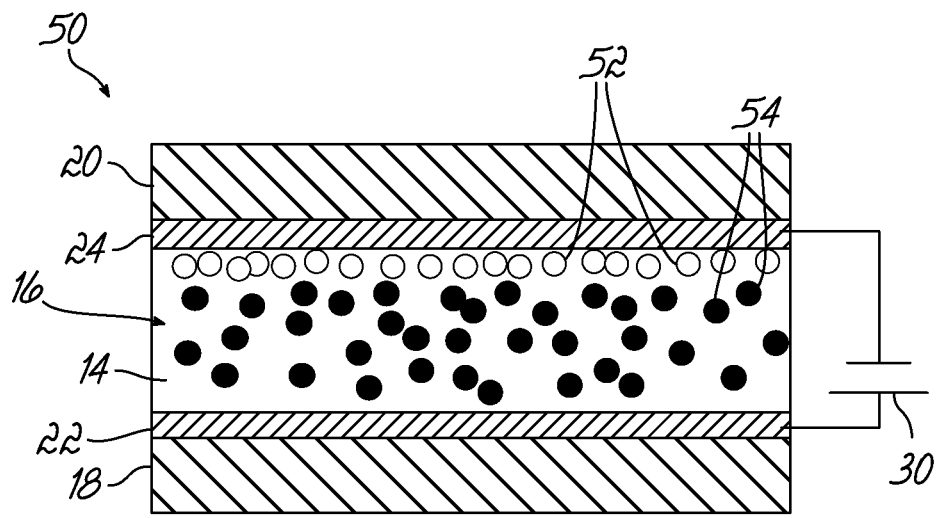
FIG. 4B is a diagrammatic cross-sectional view of the electrophoretic device of FIG. 4A in which the display state of the pixel is altered.

The colored non-polar metalorganic fluid having a composition consistent with the embodiments of the invention can also be used in an electrophoretic device for a display. With reference to FIGS. 4A, 4B in which like reference numerals refer to like features in FIGS. 1A, 1B and in accordance with an embodiment of the invention, the non-polar fluid 14 may be used as the contrasting color for a pixel 50 of single particle type electrophoretic display. Specifically, charged particles 52 are suspended within a volume of non-polar fluid 14 and the pixel 50 has the appearance of the coloration of the particles 54 of the non-polar fluid 14. When a potential difference is applied between the electrodes 18, 20 by a voltage from the voltage source 30, the charged particles 52 are electrostatically attracted toward at least one of the electrodes 18, 20, in this instance electrode 20 as shown in FIG. 4B. As a result of the redistribution of the charged particles 52 within the bulk of the colored non-polar metalorganic fluid 14, the visible appearance of the pixel 50 changes to reflect the coloration of the charged particle 52 due to the change in display state. These two contrasting display states of the pixel 10 shown in FIGS. 4A, 4B, along with contrasting display states of other pixels (not shown) similar to pixel 50, may be used by the display to generate an image. Alternatively, when the dye in the non-polar fluid 14 are appropriately charged, the colored non-polar metalorganic fluid 14 may be a contrasting color in a dual particle type display.

Accordingly, due to higher solubility, especially in non-polar solvents versus conventional dyes, the use of modified, oligomeric, or polymeric dyes offers desirable color strength and saturation, allowing for construction of thinner colored layers in a device, and the ability to achieve higher contrast ratios. Modified, oligomeric, and polymeric dyes also are less prone to crystallization in solution at lower temperature, e.g., less −40° C., and also less prone to diffusion from one fluid to another, due to their higher molecular weight, thereby providing improved device reliability. In addition, modified, oligomeric, and polymeric dyes offer improved solubility without increasing the content of small ions or the conductivity of the fluid, given that the solubilizing groups are preferably non-ionic. These properties offer improved performance over existing dyes and have desirable utility as dispersing and stabilizing agents for pigmented polar and non-polar fluids for electrowetting, electrophoretic, and electrofluidic chromatophore devices.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A colored metalorganic fluid comprising:
   at least one polar or non-polar solvent and at least one modified, oligomeric, polymeric dye in the solvent, the dye having at least one chromophore attached to a low molecular weight group with molecular weight up to 800 or an oligomeric or polymeric chain, wherein the low molecular weight group or the oligomeric or polymeric chain includes silicon or germanium, the dye further having a total molecular weight from 100 to 100,000, solubility in the solvent of at least 5% by wt at 25° C., and a dynamic viscosity from 0.1 cPs to 2,000 cPs at 25° C., and
   wherein, if the solvent is the polar solvent, the colored metalorganic fluid has a conductivity from about 0.01 μS/cm to 3000 μS/cm, a surface tension of 15 dynes/cm to 90 dynes/cm at 25° C., and a total content of monatomic ions with radii smaller than 2.0 Å and polyatomic ions with radii smaller than 1.45 Å less than 500 ppm, and, if the solvent is the non-polar solvent, the colored metalorganic fluid has a conductivity less than 5×10$^{-3}$ μS/cm and a surface tension of 10 dynes/cm to 40 dynes/com at 25° C.

2. The colored metalorganic fluid of claim 1 wherein the modified, oligomeric, or polymeric dye is defined by at least one of the following formulas:

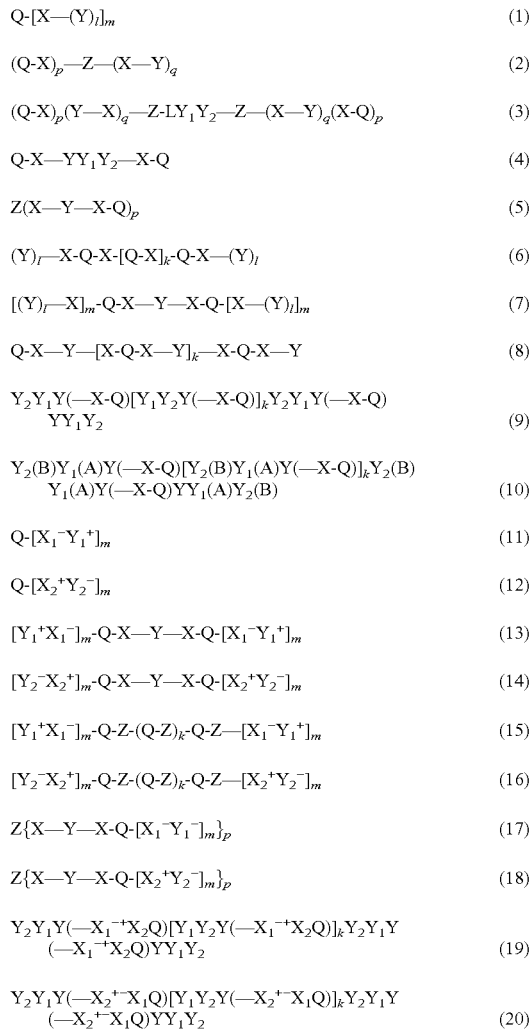

where:

Q is a chromophore;

X is R, RC(O)O, ROC(O), RC(O)NR$_1$, RNR$_1$C(O), SO$_2$NR$_1$, SO$_2$, RO, RS, RNR$_1$, =N—, RNHC(O)NR$_1$, RNHC(O)O, ROC(O)NH, OC(O)OCH$_2$NR$_1$, RC(O)OCH$_2$CH(OH)CH$_2$, RSO$_3^-$, ROSO$_3^-$, RCCO$^-$, ROPO$_3^{2-}$, RPO$_3^{2-}$, RR$_1$R$_2$R$_3$N$^+$, RR$_1$R$_2$R$_3$P$^+$, where R, R$_1$, R$_2$, and R$_3$ independently are hydrogen, alkyl, aryl, alkylaryl, alicycle, or heterocycle;

Y is a low molecular weight group with a molecular weight of up to 800 or a linear, branched, dendritic, or cyclic oligomeric or polymeric chain, which includes silicon or germanium;

Y$_1$ and Y$_2$ are independently optional and, if present, are independently a single bond, —R$^1$R$^2$R$^3$SiO—(—SiR$^2$R$^3$O)$_r$—, —SiR$^3$R$^2$R$^1$—, a vinyl, vinylidene, or diene monomer or oligomer, polyanhydride, polyalkyleneglycol, polyester, epoxy, polyurethene, polyamide, polyimide, phenol, melamine, and urea formaldehyde, polycarbonate, polyacetal, polysulfone, polyaldehyde, or polyketone, where R$^1$ is H, alkyl, halogenated alkyl, aryl, or alkaryl; R$^2$ and R$^3$ are independantly alkyl, halogenated alkyl, aryl, alkaryl, alicycle, heterocyle, poly (alkylene oxide), alkylamine, polyalkylamine, or any combination thereof; and r=1 to 2000; or optionally together form a random or block co-polymer;

Z is a radical of 1,3,5- and 1,2,4-triazine, benzene-1,3,5-tricarboxylic acid, benzene-1,2,4-tricarboxylic acid, benzene-2,3,5,6-tetracarboxylic acid, glycerol, pentaerythritol, dimethylol propionic acid, citric acid, isocitric acid, propane-1,2,3-tricarboxylic acid, mucic acid, malic acid, tartaric acid, 2,4-dihydroxybenzoic acid, 1,3,5-triaminobenzene, 1,3,5-trihydroxybenzene, gallic acid, 2-amino-1,3-propanediol, triethanolamine;

L is a single bond or a bifunctional linking group;

A and B are independently H, alkyl, aryl, alkyl aryl, heterocycle, vinyl, vinylidene, or diene monomer or oligomer, polyanhydride, polyalkyleneglycol, polyester, epoxy, polyurethane, polyamide, polyimide, phenol, melamine, urea formaldehyde, polycarbonate, polyacetal, polysulfone, polyaldehyde, or polyketone;

$X_1^-$ is an anionic group of the chromophore;

$X_2^+$ is a cationic group of the chromophore;

$Y_1^+$ is a cationic group of the oligomer or polymer;

$Y_2^-$ is an anionic group of the oligomer or polymer; and l is 1-2; m is 1-8; p and q are 1-4; p+q<5; and k is 0-500.

3. The colored metalorganic fluid of claim 2 wherein Y is selected from a silsesquioxane oligomeric or polymeric chain; —$R^1R^2R^3SiO$—(—$SiR^2R^3O$)$_r$—$SiR^2R^3R^4$; —$R^1R^2R^3SiO$—(—$SiR^2R^3O$)$_r$—$SiR^3R^2R^1$—; $R^2R^3R^4SiO$—(—$SiR^2R^3O$)$_r$—[$Si(R^3$—)$R^2O$—]$_n$—$SiR^2R^3R^4$; —$R^1$—$Si[$—$O($—$SiR^2R^3O$)$_r$—$SiR^2R^3R^4]_3$, or any combination thereof, where $R^1$ is H, alkyl, halogenated alkyl, aryl or alkaryl; $R^2$, $R^3$ and $R^4$ are independently alkyl, halogenated alkyl, aryl, alkaryl, alicycle, heterocyle, poly(alkylene oxide), alkylamine, polyalkylamine, r=1-2000, n=1-2000; and n+r<2000.

4. The colored metalorganic fluid of claim 1 wherein the solvent is the polar solvent.

5. The colored metalorganic fluid of claim 4 wherein the polar solvent has a dielectric constant greater than 10, a surface tension of 25 dynes/cm to 90 dynes/cm, a dynamic viscosity from 0.1 to 2,000 cPs at 25° C., and an electrowetting relative response (EWRR) to direct or alternating current of 30V in the range of 20-80%.

6. The colored metalorganic fluid of claim 4 wherein the polar solvent is selected from hydrophilic silicones, water, glycols, polyglycols, alcohols, polyols, ethers, esters, ketals, lactones, ketones, lactams, pyrrolidones and polyvinylpyrrolidones, pyrrolidines, carbonates, ureas, sulfones, sulfoxides, amines, imines, amides, nitriles, carboxylic acids, acetals, carbamates, aldehydes, halogenated, thio, or nitro compounds, ionic fluids, or any mixtures thereof.

7. The colored metalorganic fluid of claim 4 wherein the polar solvent is a hydrophilic compound including silicon and/or germanium.

8. The colored metalorganic fluid of claim 1 wherein the solvent is the non-polar solvent.

9. The colored metalorganic fluid of claim 8 wherein the non-polar solvent has a dielectric constant less than 10, a dynamic viscosity at 25° C. from 0.1 to 2,000 cPs, and a surface tension of 10 dynes/cm to 40 dynes/cm.

10. The colored metalorganic fluid of claim 8 wherein the non-polar solvent is selected from non-substituted, substituted, linear, branched or cyclic compounds including silicon and/or germanium; aliphatic or aromatic hydrocarbons, partially hydrogenated aromatic hydrocarbons, alicyclic or aromatic heterocyclic compounds or derivatives thereof containing a halogen, nitro, nitrozo, or cyano groups; fatty alcohols and carboxylic acids and their esters, ethers, and amides.

11. The colored metalorganic fluid of claim 8 wherein the non-polar solvent is a compound including silicon and/or germanium.

12. The colored metalorganic fluid of claim 1 wherein the modified, oligomeric and/or polymeric dye is present in an amount from about 0.01% weight to about 50% weight of the fluid and the polar or non-polar solvent is present in an amount from about 50% to about 99.99% weight of the fluid.

13. The colored metalorganic fluid of claim 2 further comprising a pigment, which is stabilized by the dye.

14. The colored metalorganic fluid of claim 13 wherein the pigment has a particle size from 10 to 400 nm.

15. The colored metalorganic fluid of claim 13 wherein the dye is present in an amount from 0.01% to 40% weight of the fluid, the pigment is present in an amount from 0.01% to 30% by weight of the fluid, and the polar or non-polar solvent is present in an amount from 40% to 99.98% weight of the fluid.

16. An electrowetting or electrofluidic device including the colored metalorganic fluid of claim 1.

17. The device of claim 16 wherein the colored metalorganic fluid includes the polar solvent to define a colored metalorganic polar fluid and further comprising another colored metalorganic fluid of claim 1, which includes the non-polar solvent thereby defining a colored metalorganic non-polar fluid.

18. An electrophoretic device including the colored metalorganic fluid of claim 1, which includes the non-polar solvent thereby defining a non-polar fluid.

19. A pixel for a display including the colored metalorganic fluid of claim 1.

20. A method for changing a display state of a pixel for a display, the method comprising:

applying a potential difference to a reservoir of the pixel that includes the colored metalorganic fluid of claim 1, via a plurality of electrodes to create a change in the display state of the pixel by moving or changing the shape of the colored metalorganic fluid.

* * * * *